(12) United States Patent
Li et al.

(10) Patent No.: US 11,525,947 B2
(45) Date of Patent: Dec. 13, 2022

(54) FRESNEL LENS AND DISPLAY DEVICES WITH SUCH FRESNEL LENS

(71) Applicant: Guangzhou Mid Technology Co., Ltd., Guangzhou (CN)

(72) Inventors: Kunyang Li, Guangzhou (CN); Di Pan, Guangzhou (CN); Yuqiao Xian, Guangzhou (CN); Hang Fan, Guangzhou (CN); Weitang Liang, Guangzhou (CN)

(73) Assignee: GUANGZHOU MID TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 17/486,128

(22) Filed: Sep. 27, 2021

(65) Prior Publication Data

US 2022/0011472 A1 Jan. 13, 2022

Related U.S. Application Data

(62) Division of application No. 16/478,146, filed as application No. PCT/CN2017/119015 on Dec. 27, 2017, now abandoned.

(30) Foreign Application Priority Data

Jan. 16, 2017 (CN) .......................... 201710029351.9

(51) Int. Cl.
G02B 3/08 (2006.01)
(52) U.S. Cl.
CPC ...................................... *G02B 3/08* (2013.01)
(58) Field of Classification Search
CPC ..................................................... G02B 3/08
(Continued)

(56) References Cited

U.S. PATENT DOCUMENTS

| 3,622,231 A | 11/1971 | Hansen |
| 4,859,043 A | 8/1989 | Carel et al. |

(Continued)

FOREIGN PATENT DOCUMENTS

| CN | 102590903 A | 7/2012 |
| CN | 104272180 A | 1/2015 |

(Continued)

OTHER PUBLICATIONS

International Search Report for PCT/CN2017/119015 dated Apr. 3, 2018.

(Continued)

*Primary Examiner* — Laura K Tso
(74) *Attorney, Agent, or Firm* — Schmeiser, Olsen & Watts, LLP

(57) ABSTRACT

Provided is a Fresnel lens and display device with such Fresnel lens, the Fresnel lens includes an entrance plane and an exit plane with multiple bump units. The bump units include a First Bump Unit, a Second Bump Unit, and a Third Bump Unit; on one side of the central axis of said lens, the First Bump Unit, Second Bump Unit and Third Bump Unit are placed successively along the radiation direction from the central axis toward the lens edge; on the other side of the central axis of said lens, the First Bump Unit, Second Bump Unit and Third Bump Unit are also placed successively along the radiation direction from the central axis toward the lens edge. The Bump Units on both sides of the central axis of the lens are symmetrical.

15 Claims, 6 Drawing Sheets

(58) Field of Classification Search
USPC .................................. 359/742; 362/326–340
See application file for complete search history.

(56) References Cited

U.S. PATENT DOCUMENTS

| | | | |
|---|---|---|---|
| 6,264,347 | B1 | 7/2001 | Godbillon |
| 7,733,580 | B2 * | 6/2010 | Ieda ........................ G02B 3/08 |
| | | | 359/742 |
| 9,329,309 | B2 | 5/2016 | Van Heugten |
| 10,054,725 | B2 | 8/2018 | Van Heugten |
| 2006/0232976 | A1 | 10/2006 | Lin |
| 2010/0220473 | A1 | 9/2010 | Park |
| 2013/0051029 | A1 * | 2/2013 | Suzuki ..................... G02B 3/08 |
| | | | 362/297 |
| 2013/0222756 | A1 | 8/2013 | Van Heugten |
| 2014/0204592 | A1 | 7/2014 | Miyashita |
| 2016/0202399 | A1 | 7/2016 | Van Heugten |

FOREIGN PATENT DOCUMENTS

| | | |
|---|---|---|
| CN | 105570883 A | 5/2016 |
| CN | 205331882 U | 6/2016 |
| CN | 106125168 A | 11/2016 |
| CN | 106772718 A | 5/2017 |

OTHER PUBLICATIONS

Restriction Requirement dated Apr. 6, 2021 for U.S. Appl. No. 16/478,146.

Non-Final Office Action dated Jun. 25, 2021 for U.S. Appl. No. 16/478,146.

* cited by examiner

FRESNEL LENS AND DISPLAY DEVICES WITH SUCH FRESNEL LENS

CROSS-REFERENCE TO RELATED APPLICATIONS

This application is a divisional patent application of U.S. application Ser. No. 16/478,146, having a filing date of Jul. 16, 2019, which claims priority to PCT Application No. PCT/CN2017/119015, having a filing date of Dec. 27, 2017, which claims priority to Chinese Application No. 201710029351.9, having a filing date of Jan. 16, 2017, the entire contents all of which are hereby incorporated by reference.

FIELD OF TECHNOLOGY

The following relates to Fresnel lens and display devices with such Fresnel lens. More specifically, the following relates to Fresnel lens including multiple bump units.

BACKGROUND

Briefly, Fresnel lens refer to lens with several grooves on the surfaces that can reflect or refract light within certain spectral range. Due to its large-area, lightness, cheapness and portability, Fresnel lens is widely used in optical design.

Fresnel lens array, one form of Fresnel lens, comprises several Fresnel lens arranged according to a certain array arrangement. However, the existing Fresnel lens array more or less causes problems, including uneven brightness, moiré pattern effect and discontinuous peripheral brightness. These problems not only affect viewing experience, but restrict the application of Fresnel lens as well.

SUMMARY

An aspect relates to a Fresnel lens and display devices with such Fresnel lens, which Fresnel lens solve or partly solve the problems in existing Fresnel lens arrays, such as uneven brightness, moiré pattern effect and discontinuous peripheral brightness, thereby improving viewing experience.

In order to achieve the purpose, technical solutions adopted by the present disclosure are as follows:

An aspect of the present disclosure provides a Fresnel lens comprising an entrance plane and an exit plane with multiple bump units thereon. The bump units compromise: a First Bump Unit comprising multiple First Orthogonal Sawteeth, wherein the first orthogonal sawteeth have the same tooth-width and their tooth-depth gradually increases along the radiation direction from the central axis toward the lens edge; a Second Bump Unit comprising multiple Second Orthogonal Sawteeth, wherein the second orthogonal sawteeth have the same tooth-depth and their tooth-width gradually decreases along the radiation direction from the central axis toward the lens edge; a Third Bump Unit comprising multiple Second Double-sided Sawteeth, wherein the second double-sided sawteeth have the same tooth-depth and their tooth-width gradually decreases along the radiation direction from the central axis toward the lens edge. On one side of the central axis of the lens, the First Bump Unit, Second Bump Unit and Third Bump Unit are placed successively along the radiation direction from the central axis toward the lens edge; on the other side of the central axis of the lens, the First Bump Unit, Second Bump Unit and Third Bump Unit are also placed successively along the radiation direction from the central axis toward the lens edge. The Bump Units on both sides of the central axis of the lens are symmetrically arranged.

A further aspect of the present disclosure provides a Fresnel lens comprising an entrance plane and an exit plane with multiple bump units thereon. The bump units comprise: a First Bump Unit comprising multiple First Orthogonal Sawteeth, wherein the first orthogonal sawteeth have the same tooth-width and their tooth-depth gradually increases along the radiation direction from the central axis toward the lens edge; a Second Bump Unit comprising multiple First Double-sided Sawteeth, wherein the first double-sided sawteeth have the same tooth-width and their tooth-depth gradually increases along the radiation direction from the central axis toward the lens edge; a Third Bump Unit comprising multiple Second Double-sided Sawteeth, wherein the second double-sided sawteeth have the same tooth-depth and their tooth-width gradually decreases along the radiation direction from the central axis toward the lens edge. On one side of the central axis of the lens, the First Bump Unit, Second Bump Unit and Third Bump Unit are placed successively along the radiation direction from the central axis toward the lens edge; on the other side of the central axis of the lens, the First Bump Unit, Second Bump Unit and Third Bump Unit are also placed successively along the radiation direction from the central axis toward the lens edge. The Bump Units on both sides of the central axis of the lens are symmetrically arranged.

A further aspect of the present disclosure provides a Fresnel lens comprising an entrance plane and an exit plane with multiple bump units thereon. The bump units comprise: a First Bump Unit comprising multiple First Orthogonal Sawteeth, wherein the first orthogonal sawteeth have the same tooth-width and their tooth-depth gradually increases along the radiation direction from the central axis toward the lens edge; a Second Bump Unit comprising multiple Second Double-sided Sawteeth wherein the second double-sided sawteeth have the same tooth-depth and their tooth-width gradually decreases along the radiation direction from the central axis toward the lens edge. On one side of the central axis of the lens, the First Bump Unit and Second Bump Unit are placed successively along the radiation direction from the central axis toward the lens edge. On the other side of the central axis of the lens, the First Bump Unit and Second Bump Unit are also placed successively along the radiation direction from the central axis toward the lens edge. The Bump Units on both sides of the central axis of the lens are symmetrically arranged.

Another implementation in the present disclosure provides a Fresnel lens comprising an entrance plane and an exit plane with multiple bump units thereon. The bump units comprise: a First Bump Unit comprising multiple First Orthogonal Sawteeth, wherein the first orthogonal sawteeth have the same tooth-width and their tooth-depth gradually increases along the radiation direction from the central axis toward the lens edge; a Second Bump Unit comprising multiple Second Orthogonal Sawteeth, wherein the second orthogonal sawteeth have the same tooth-depth and their tooth-width gradually decreases along the radiation direction from the central axis toward the lens edge. On one side of the central axis of the lens, the First Bump Unit and Second Bump Unit are placed successively along the radiation direction from the central axis toward the lens edge; on the other side of the central axis of the lens, the First Bump Unit and Second Bump Unit are also placed successively along the radiation direction from the central axis toward the lens edge. The Bump Units on both sides of the central axis of the lens are symmetrically arranged.

Another aspect of the present disclosure provides a display device with Fresnel lens according to any above mentioned aspect of the present disclosure.

The advantages of the technical solutions provided by the present disclosure are as follows:

The design uses directional backlight. LCD is placed in front of the lens independently and LED array act as light sources. We have more freedom to arrange light sources array and lens array, thereby eliminating restriction of traditional lenticular lens array 3D display for pixel serving as image sources and light sources simultaneously.

The distance between the lens and LCD is adjustable within a certain range. LCD can be flat or curved.

The present disclosure provides a Fresnel lens and a display device with such Fresnel lens for solving or partly solving the problems in existing Fresnel lens arrays such as uneven brightness, moiré pattern effect and discontinuous peripheral brightness, thereby improving viewing experience.

BRIEF DESCRIPTION

Some of the embodiments will be described in detail, with reference to the following figures, wherein like designations denote like members, wherein:

FIG. 1(a) schematically illustrates the structure of the Fresnel lens according to embodiment 1 of the present disclosure;

FIG. 1(b) schematically illustrates the structure of the Fresnel lens according to embodiment 1 of the present disclosure;

FIG. 1(c) schematically illustrates the structure of the Fresnel lens according to embodiment 1 of the present disclosure;

FIG. 2 schematically illustrates focused light through the First Orthogonal Sawteeth of the first bump unit and the Second Orthogonal Sawteeth of the second bump unit inside the Fresnel lens according to a preferred embodiment in the present disclosure;

FIG. 3 schematically illustrates focused light through the double-sided sawteeth of the third bump unit inside the Fresnel lens according to a preferred embodiment in the present disclosure;

Figure 8:
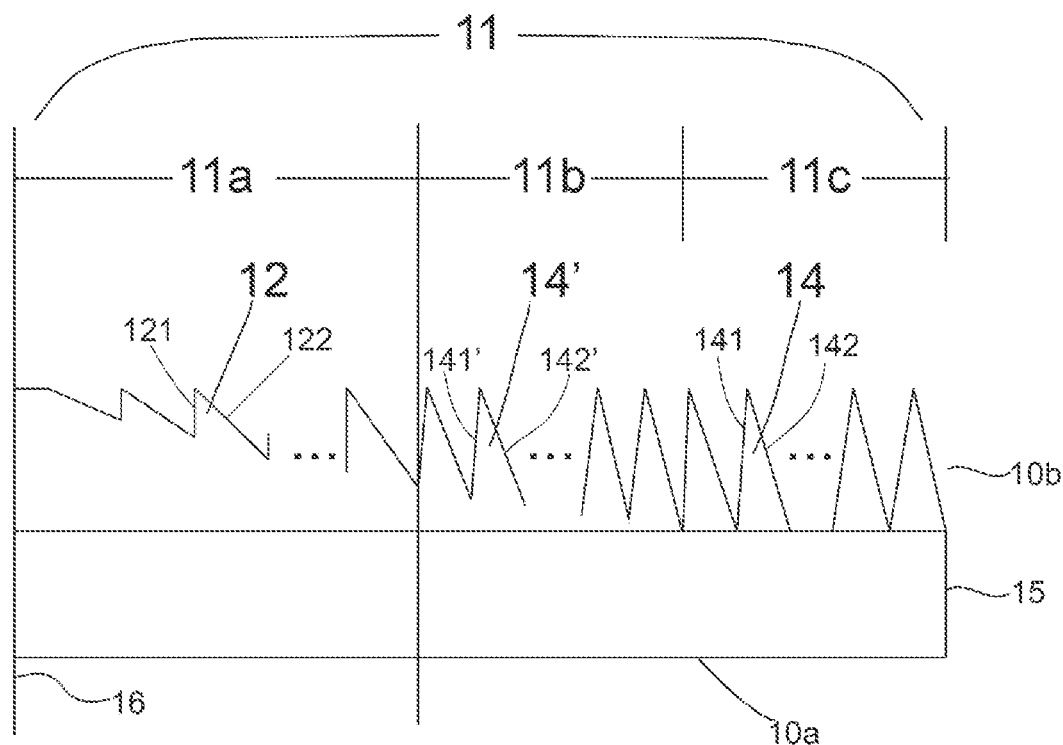
Figure 9:
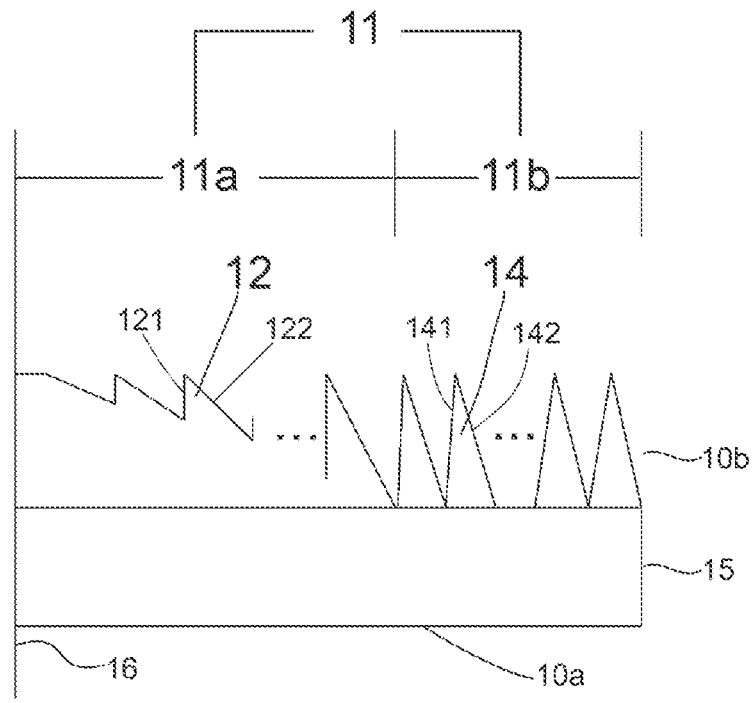
Figure 10:
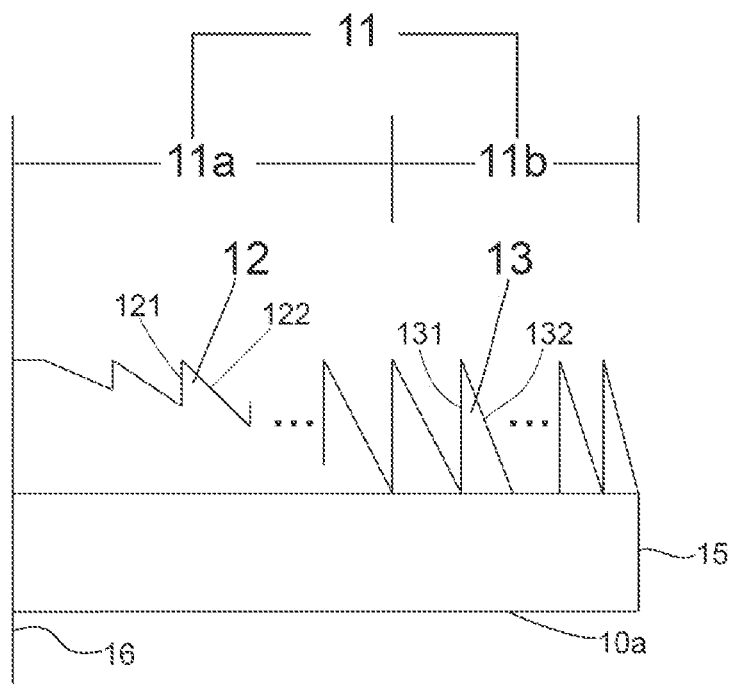

FIG. 8 schematically illustrates the structure of the Fresnel lens according to embodiment 2 of the present disclosure;

FIG. 9 schematically illustrates the structure of the Fresnel lens according to embodiment 3 of the present disclosure; and FIG. 10 schematically illustrates the structure of the Fresnel lens according to embodiment 4 of the present disclosure.

POSITION NUMBER LIST

10: Fresnel lens;
10a: entrance plane; 10b: exit plane;
11: bump units; 11a: first bump unit;
11b: second bump unit;
11c: third bump unit;
12: first orthogonal sawteeth;
121: first right-angle side;
122: first hypotenuse;
13: second orthogonal sawteeth;
131: second right-angle side;
132: second hypotenuse;
14': first double-sided sawteeth;
141': third oblique side;
142': fourth oblique side;
14: second double-sided sawteeth;
141: first oblique side;
142: second oblique side;
$d_{11}, d_{12}, d_{13} \ldots d_{1i}$: tooth-width of first orthogonal sawteeth;
$h_{11}, h_{12}, h_{13} \ldots h_{1i}$: tooth-depth of first orthogonal sawteeth;
$d_{21}, d_{22}, \ldots d_{2(j-1)}, d_{2j}$: tooth-width of second orthogonal sawteeth;
$h_{21}, h_{22} \ldots h_{2(j-1)}, h_{2j}$: tooth-depth of second orthogonal sawteeth;
$d_{31}, d_{32} \ldots d_{3(k-1)}, d_{3k}$: tooth-width of double-sided sawteeth;
$h_{31}, h_{32} \ldots h_{3(k-1)}, h_{3k}$: tooth-depth of double-sided sawteeth;
$\gamma_1, \gamma_2 \ldots \gamma_{(k-1)}, \gamma_k$: first included angle;
$\theta_1, \theta_2 \ldots \theta_{(k-1)}, \theta_k$: second included angle;
$\alpha_1, \alpha_2, \alpha_3 \ldots \alpha_i$: third included angle;
$\beta_1, \beta_2 \ldots \beta_{(j-1)}, \beta_j$: fourth included angle;
W: width of the first bump unit;
15: lens edge;
16: central axis of lens;
2: backlight module;
22,20,23: lighting units;
A, B, C: points on the lighting units 20,22,23;
D: focus point on the lens optical axis;
41: viewing range.

DETAILED DESCRIPTION

The above objects, features and advantages of the present disclosure will be more apparent from the following detailed description with reference to the figures.

Embodiment 1

Figure 1A:
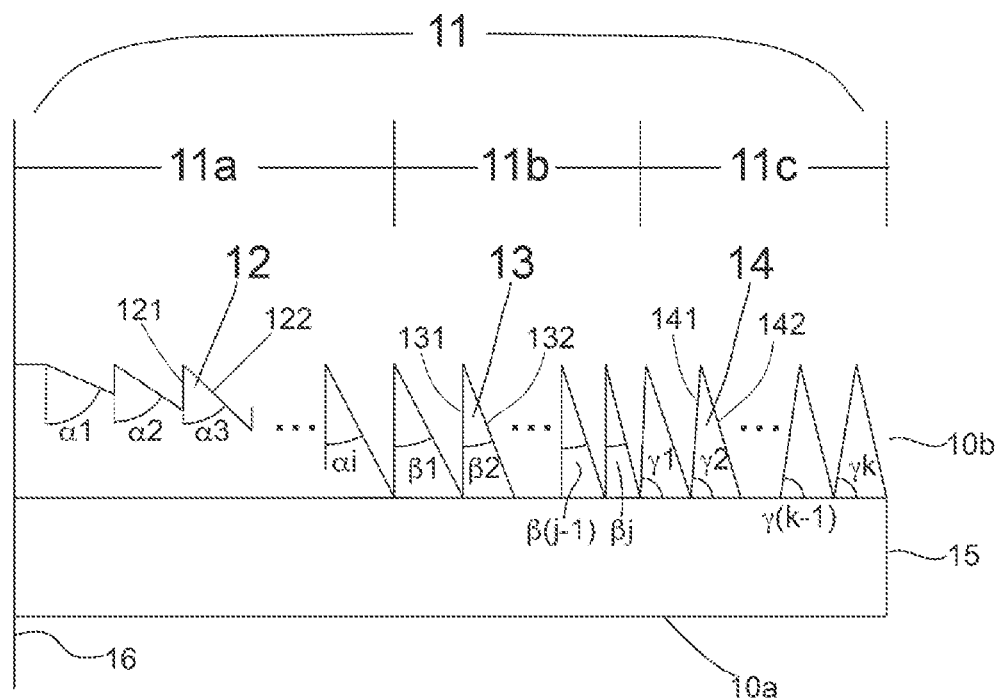
Figure 1B:
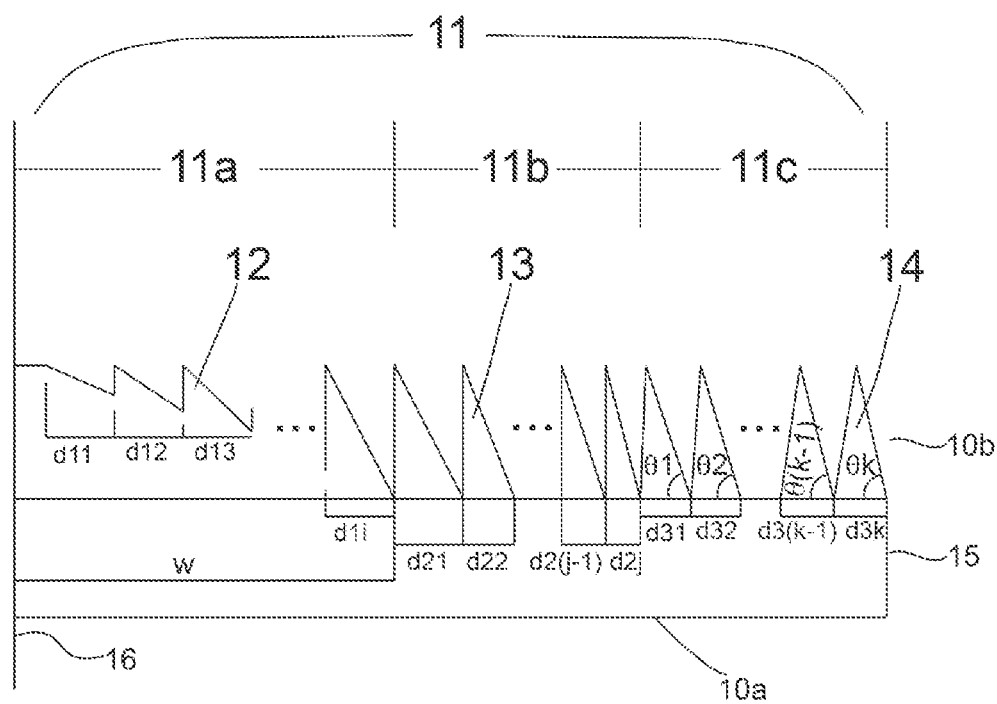
Figure 1C:
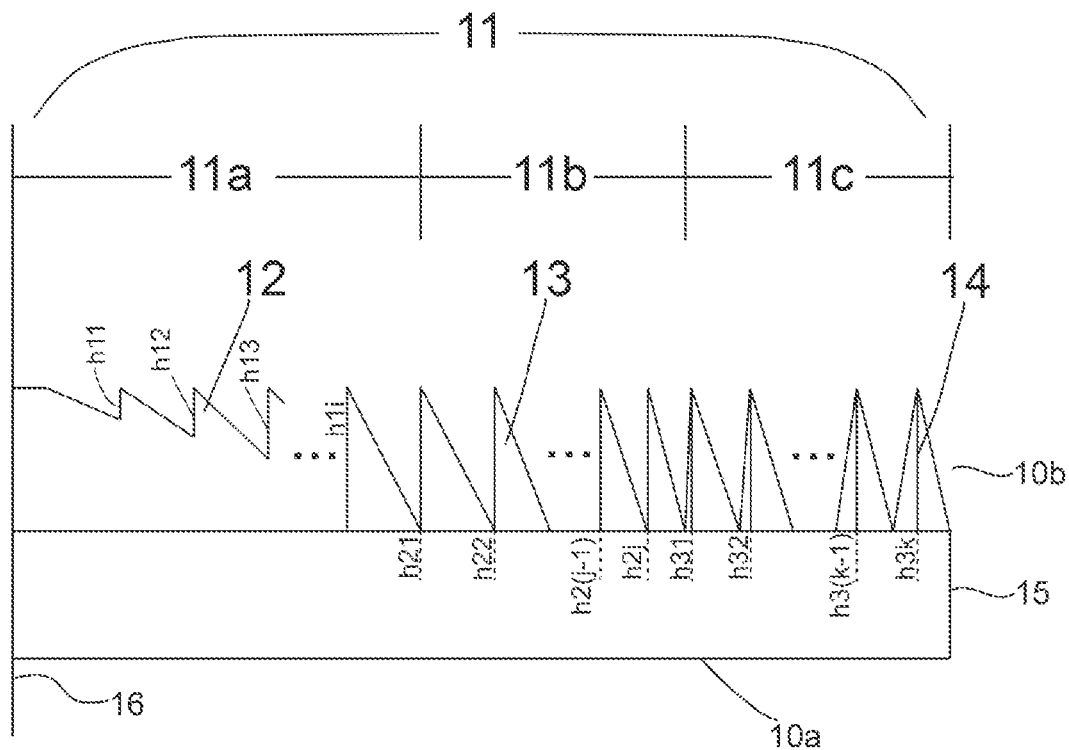

As shown in the FIG. 1(a), 1(b), 1(c), Fresnel lens 10 according to embodiment 1 comprises an entrance plane 10a and an exit plane 10b with multiple bump units 11 thereon.

The bump units 11 comprise:

A first bump unit 11a comprising multiple first orthogonal sawteeth 12 the tooth-width $d_{1i}$ of each first orthogonal sawtooth is the same and the tooth-depth $h_{1i}$ of each first orthogonal sawtooth gradually increases in radial direction from the central axis 16 toward the lens edge 15;

Wherein each first orthogonal sawtooth 12 comprises a first right-angle side 121 perpendicular to the entrance plane 10a, a first hypotenuse 122 intersecting with the first right-angle side 121, and a third included angle $\alpha_i$ formed by the first right-angle side 121 and the first hypotenuse 122, the third included angle $\alpha_i$ gradually decreases along the radial direction from the central axis toward the lens edge. The first hypotenuse 122 and the entrance plane 10a intersects between the lens edge 15 and the first right-angle side 121.

As shown in FIGS. 1(a), 1(b), and 1(c), the first orthogonal sawteeth of the first bump unit 11a are numbered as first orthogonal sawteeth 1,2,3 . . . i and arranged radially from the central axis toward the lens edge; the first orthogonal sawteeth have the same tooth-width, that is, $d_{11}=d_{12}=d_{13}= \ldots =d_{1i}$; as the first orthogonal sawteeth are located more and more close to the lens edge, the tooth-depth of each first orthogonal sawtooth increases while the third included angle of each first orthogonal sawtooth decreases, that is, $h_{11}<h_{12}<h_{13}< \ldots <h_{1i}$, $\alpha_1>\alpha_2>\alpha_3> \ldots >\alpha_i$.

A second bump unit 11b comprising multiple second orthogonal sawteeth 13, the multiple second orthogonal sawteeth have the same tooth-depth $h_{2j}$ and the tooth-width $d_{2j}$ of the multiple second orthogonal sawteeth gradually decreases along the radial direction from the central axis toward the lens edge.

Wherein each second orthogonal sawtooth 13 comprises a second right-angle side 131 perpendicular to the entrance plane, a second hypotenuse 132 intersecting with the second right-angle side 131, and a fourth included angle $\beta_j$ formed by the second right-angle side 131 and the second hypotenuse 132. The second hypotenuse 132 and the entrance plane 10a intersects between the lens edge 15 and the second right-angle side 131.

As shown in FIGS. 1(a), 1(b), and 1(c), the second orthogonal sawteeth of the second bump unit 11b are numbered as second orthogonal sawteeth 1,2,3 . . . i and arranged radially from the central axis toward the lens edge; the second orthogonal sawteeth have the same tooth-depth, that is, $h_{21}=h_{22}=h_{23}= \ldots =h_{2i}$; as the second orthogonal sawteeth are located more and more close to the lens edge, the tooth-width of each second orthogonal sawtooth and the fourth included angle of each second orthogonal sawtooth both decrease, that is, $d_{21}>d_{22}>d_{23}> \ldots >d_{2i}$; the fourth included angle satisfying $\beta_1>\beta_j>\beta_j> \ldots >\beta_j$.

A third bump unit 11c comprising multiple second double-sided sawteeth 14. The multiple second double-sided sawteeth have the same tooth-depth $h_{3k}$ and the tooth-width $d_{3k}$ of the multiple second double-sided sawteeth gradually decreases along the radial direction from the central axis toward the lens edge.

Wherein each second double-sided sawtooth 14 comprises a first oblique side 141, a second oblique side 142 intersecting with the first oblique side 141, both oblique sides intersect with the entrance 10a, and a first/second included angle $\gamma_k/\theta_k$ formed by the first/second oblique side 141/142 and the entrance plane 10a.

The first included angel $\gamma_k$ gradually decreases along the radial direction from the central axis toward the lens edge, and the second included angle $\theta_k$ gradually increases along the radial direction from the central axis toward the lens edge.

As shown in FIGS. 1(a), 1(b), and 1(c), the second double-sided sawteeth of the third bump unit 11c are numbered as second double-sided sawteeth 1,2,3 . . . i and arranged radially from the central axis toward the lens edge; the second double-sided sawteeth have the same tooth-depth, that is, $h_{31}=h_{32}=h_{33}= \ldots =h_{3k}$; as the second double-sided sawteeth are located more and more close to the lens edge, the tooth-width and the first included angle of each second double-sided sawtooth decrease while the second included angle of each second double-sided sawtooth increases, that is, $d_{31}>d_{32}>d_{33}> \ldots >d_{3i}$; $\gamma_1>\gamma_2>\gamma_3> \ldots >\gamma_k$; $\theta_1<\theta_2<\theta_3< \ldots <\theta_k$.

Wherein there exists no interspace between the first/second bump unit 11a/11b and the second/third bump unit 11b/11c.

At the splicing between the first bump unit 11a and the second bump unit 11b, the tooth-depth of the sawtooth 12 closest to the lens edge in the first bump unit is equal to the tooth-depth of the adjacent second orthogonal sawtooth 13. The tooth-width of the first sawtooth which is nearest to the central axis in the second orthogonal sawteeth is equal to the tooth-width of the the first orthogonal sawteeth and the tooth-width of each second orthogonal sawtooth gradually decreases radially from the central axis toward the lens edge as the sawtooth is getting closer to the lens edge. Here it should be interpreted as following: a first region, from the central axis to the splicing between the first bump unit and the second bump unit, has multiple first orthogonal sawteeth with the same tooth-width. And the tooth-depth of the first orthogonal sawteeth gradually increases in radially direction from the central axis toward the splicing between the first bump unit and the second bump unit.

Specifically, as shown in the FIG. 1(c), the tooth-depth $h_{1i}$ of the first orthogonal sawtooth that farthest from the central axis in the first bump unit 11a is equal to the tooth-depth $h_{21}$ of the adjacent second orthogonal sawtooth in the second bump unit 11b, that is, $h_{1i}=h_{21}$, which can be achieved by adjusting the total width of the first bump unit 11a, $W=d_{11}+d_{12}+d_{13}+ \ldots +d_{1i}$.

The second orthogonal sawtooth and the second double-sided sawteeth have the same tooth-depth, that should be similarly understood as: $h21=h22= \ldots =h2(j-1)=h2j=h31=h32= \ldots =h3(k-1)=h3k$, as shown in the FIG. 1(c). The tooth-width of the second orthogonal sawtooth closest to the lens edge in the second bump unit is less than that of the adjacent second double-sided sawtooth. Further, the tooth-width of each second double-sided sawtooth gradually decreases in radial direction from the central axis toward the lens edge.

On one side of the central axis of the lens, the first, second, third bump units are arranged successively in radial direction from the central axis toward the lens edge; on the other side of the central axis of the lens, the first, second, third bump units are arranged symmetrically.

The refractive index of the sawteeth of the Fresnel lens is 1.49, 1.5, 1.56 etc.

The Fresnel lens may be made from polymethyl methacrylate, ultra-violet curing material, glass etc. by polymethyl methacrylate (PMMA) heat press or roll-to-roll embossing. The structure of the Fresnel lens may be linear or circular. However, it should be noted that, the material and structure of Fresnel lens according to the present disclosure includes but is not limited to PMMA, UV or glass and linear or circular structure mentioned above.

The Fresnel lens with mixed sawteeth according to the present disclosure reduces machining deviation effectively and improves viewing experience by diminishing manufacturing difficulties and eliminating moiré pattern effect and discontinuous brightness at the splicing area, which means the brightness uniformity is maximized and the crosstalk ratio is minimized.

Figure 2:
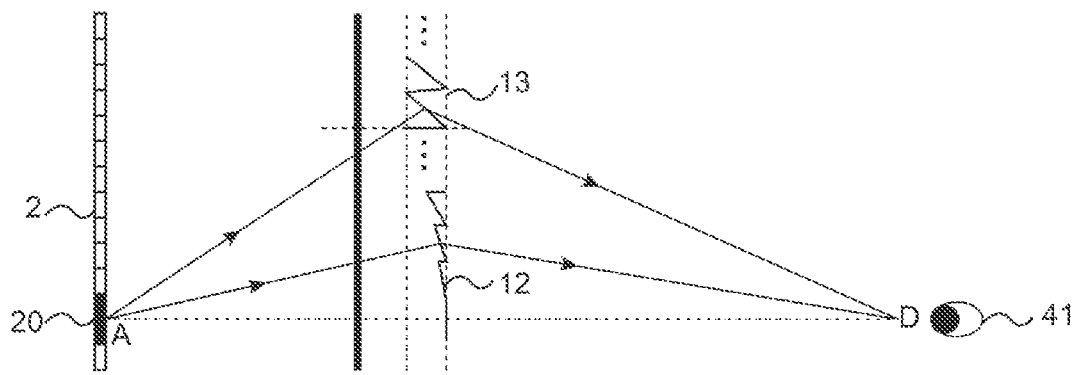

The working principle of the Fresnel lens according to the embodiment in the present disclosure is as follows:

FIG. 2 schematically illustrates focused light through the First Orthogonal Sawteeth of the first bump unit and the Second Orthogonal Sawteeth of the second bump unit inside the Fresnel lens according to a preferred embodiment in the present disclosure.

A light rays, emitting from point A in the backlight unit 20 where a backlight 2 intersects with an optical axis of the lens unit, will exit at the hypotenuse center of the sawtooth through the first hypotenuse of the first orthogonal sawteeth 12 and the second hypotenuse of the second orthogonal sawteeth 13 by adjusting the tooth-depth and tooth-width of the sawteeth appropriately, and the light rays will refocus on the same point D in the viewing range 41 on the optical axis of the lens according to Snell's law.

It is obvious in the FIG. 2 that there exists no interspace between the first orthogonal sawteeth 12 and the second orthogonal sawteeth 13; the tooth-depth of the first orthogonal sawtooth nearest to the lens edge is equal to the that of the second orthogonal sawteeth 13; the distance between the top of the first orthogonal sawteeth 12 and the entrance plane is equal to the distance between the top of the second orthogonal sawteeth 13 and the entrance plane, that is, the distance from the top of the sawteeth to the entrance plane are equal.

Figure 3:
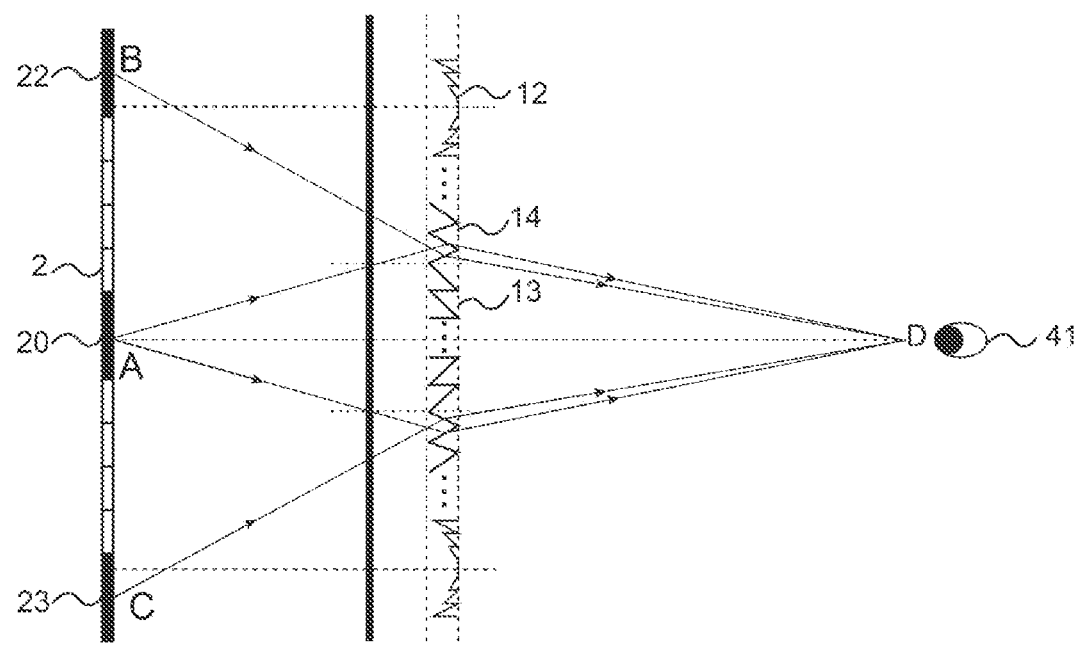

FIG. 3 schematically illustrates focused light through the double-sided sawteeth of the third bump unit inside the Fresnel lens according to a preferred embodiment in the present disclosure.

The light rays, emitting from point B, A, C in the backlight unit 22, 20, 23 where the backlight 2 intersects with the optical axis of three adjacent lens unit, will exit at the oblique side center of the sawtooth through two oblique sides of the second double-sided sawteeth 14 by adjusting the tooth-depth and tooth-width of the sawteeth appropriately, and the light rays, will refocus on the same point D in the viewing range 41 on the optical axis of the lens according to Snell's law.

It shows that each of the three backlight units corresponding to the three adjacent lens contribute to central lens imaging, which can be used to erase the discontinuous brightness which emerges at the lens peripheral.

It is obvious in the FIG. 3 that there exists no interspace between the second orthogonal sawteeth 13 and the second double-sided sawteeth 14; the tooth-depth of the second orthogonal sawteeth 13 is equal to that of the second double-sided sawteeth 14.

In this embodiment, the problems of existing Fresnel lens arrays such as moiré pattern effect and uneven brightness are solved by a configuring the first bump unit with the first orthogonal sawteeth, the second bump unit with the second orthogonal sawteeth, and the third bump unit with the second double-sided sawteeth.

Figure 4:
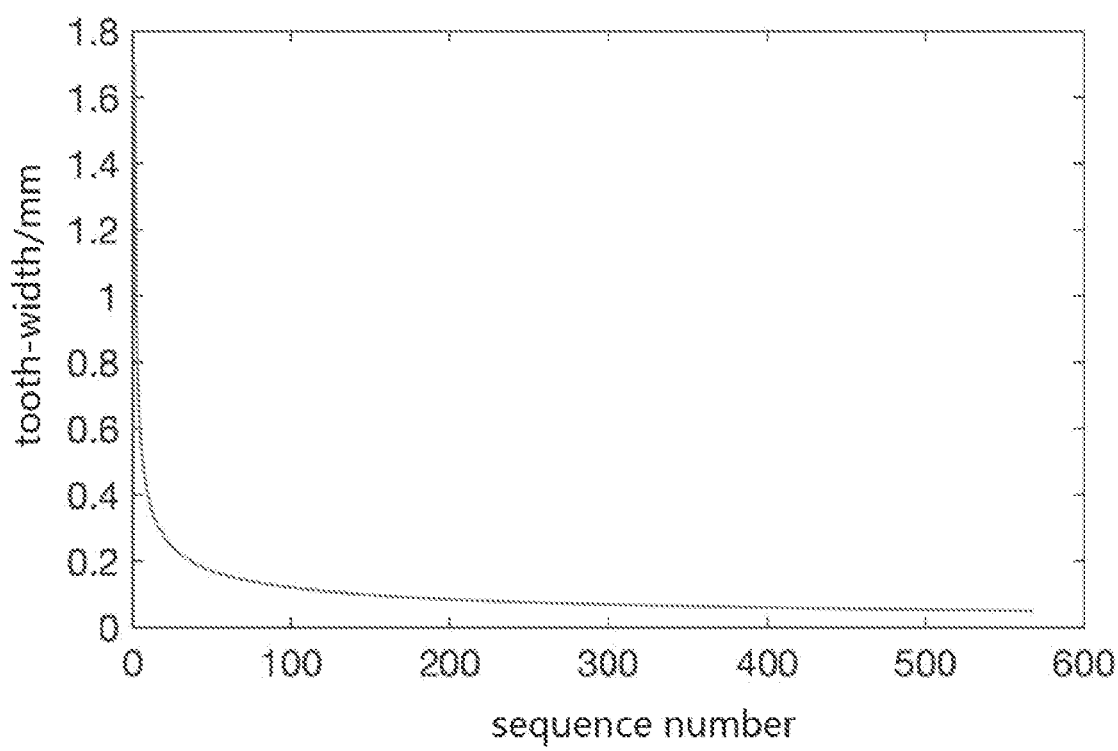
FIG. 4 is a graph illustrating tooth-width of sawteeth of existing equal-depth unequal-width Fresnel lens as a function of sequence number of the sawteeth.

FIG. 4 is a graph illustrating the tooth-width of sawteeth of existing equal-depth unequal-width Fresnel lens as a function of sequence number of the sawteeth. It is clear in FIG. 4 that the tooth-width changes sharply and widely, especially between sequence number 1 and 100, the tooth-width drops dramatically from 1.8 mm to 0.1 mm. More specifically, between sequence number 1 and 20, the tooth-width drops suddenly from 1.8 mm to 0.2 mm, which leads to high machining deviation, causing the problems of brightness defect and uneven brightness in the Fresnel lens. When the tooth-depth is very small, for example 1 µm-50 µm, due to large tooth-width of teeth in the central part, circular arc of the central sawteeth is a substantial flat surface, which will cause moiré pattern effect in the central part easily.

Figure 5:
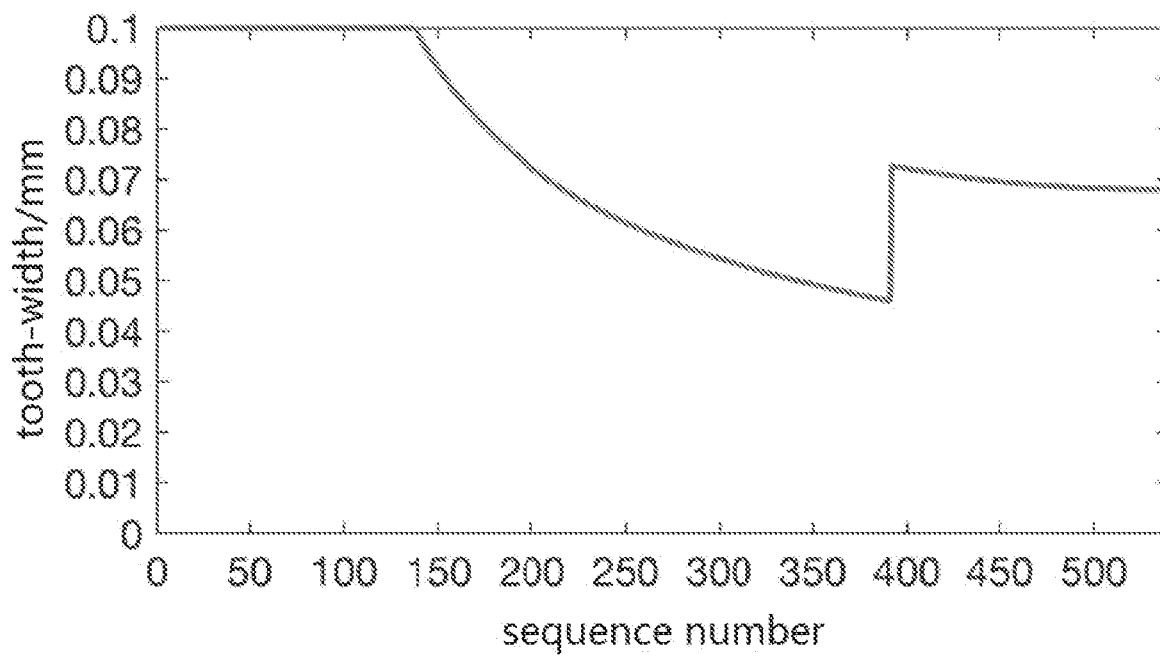
FIG. 5 is a graph illustrating the sawteeth's tooth-width of the Fresnel lens according to embodiment 1 of the present disclosure as a function of the sequence number of the sawteeth.

FIG. 5 is a graph illustrating the sawteeth's tooth-width of the Fresnel lens according to embodiment 1 in the present disclosure as a function of the sequence number of the sawteeth. It is clear in FIG. 5 that the tooth-width varies gently in a smaller range. Between sequence number 1 and around 140, the tooth-width remains 0.1 mm, which is the first orthogonal sawteeth in the first bump unit. Between sequence number 140 and around 400, the tooth-width gradually decreases from 0.1 mm to 0.045 mm around, which is the second orthogonal sawteeth in the second bump unit. As the sequence number increases from 400, the tooth-width decreases more gently from 0.075 mm to around 0.07 mm eventually. Therefore, the tooth-width in the Fresnel lens according to the embodiment in the present disclosure decreases gently in a small range, which will effectively diminish brightness defect caused by machining deviation and reduce moiré pattern effect and discontinuous brightness.

Figure 6:
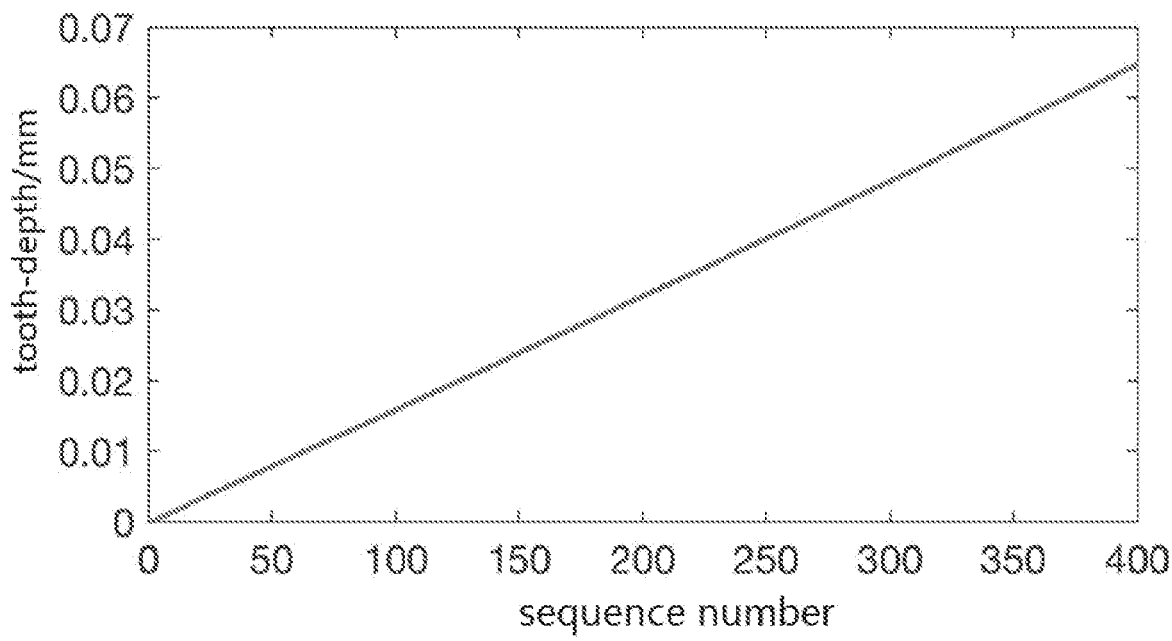
FIG. 6 is a graph illustrating the sawteeth's tooth-depth of existing equal-width unequal-depth Fresnel lens as a function of sequence number of the sawteeth.

FIG. 6 is a graph illustrating the sawteeth's tooth-depth of existing equal-width unequal-depth Fresnel lens as a function of sequence number of the sawteeth. It is clear in FIG. 6 that between sequence number 0 and 400, the tooth-depth increases from 0 to 0.065 mm. However, the sawteeth produced by known art fracture easily due to the large tooth-depth, and the fracture will cause the problems in the Fresnel lens such as brightness defect and uneven brightness. Large tooth-depth further causes significant vary in brightness in the same sawtooth, and high contrast ratio, resulting in more distinct moiré pattern effect especially at the lens peripheral, especially at the lens peripheral.

Figure 7:
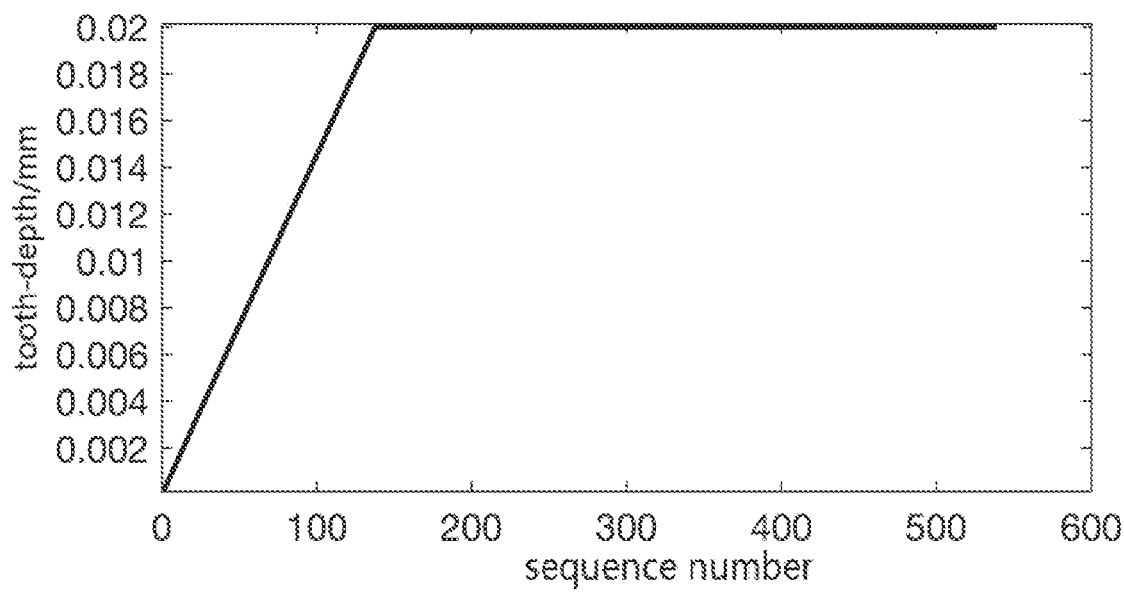
FIG. 7 is a graph illustrating the sawteeth's tooth-depth of the Fresnel lens according to embodiment 1 of the present disclosure as a function of the sequence number of the sawteeth.

FIG. 7 is a graph illustrating the sawteeth's tooth-depth of the Fresnel lens according to embodiment 1 in the present disclosure as a function of the sequence number of the sawteeth. It is clear in FIG. 7 that between sequence number 0 and around 130, the tooth-depth increases from 0 to 0.02 mm, and the tooth-depth corresponding to other sequence numbers remains 0.02 mm. On one hand, the tooth-depth range of the Fresnel lens according to embodiment 1 in the present disclosure is several times smaller than that of the existing equal-width unequal-depth Fresnel lens. On the other hand, small tooth-depth effectively diminished moiré pattern effect.

Embodiment 2

The differences between the technical solution according to embodiment 2 and that according to embodiment 1 are as follows:

As shown in FIG. 8, the Fresnel lens according to embodiment 2 of the present disclosure comprises an entrance plane and an exit plane with multiple bump units thereon. Each bump unit comprises:

A first Bump Unit comprising multiple First Orthogonal Sawteeth 12, wherein the first orthogonal sawteeth have the same tooth-width, and their tooth-depth gradually increases along the radiation direction from the central axis toward the lens edge.

A second Bump Unit 11b comprising multiple First Double-sided Sawteeth 14', wherein the first double-sided sawteeth 14' have the same tooth-width, and their tooth-depth gradually increases along the radiation direction from the central axis toward the lens edge.

A third Bump Unit 11c comprising multiple Second Double-sided Sawteeth 14, wherein the second double-sided sawteeth 14 have the same tooth-depth and their tooth-width gradually decreases along the radiation direction from the central axis toward the lens edge.

Wherein each first double-sided sawtooth 14' comprises a third oblique side 141' close to the central axis of the lens and a fourth oblique side 142' close to the lens edge, the third oblique side 141' and the fourth oblique side 142' intersect at top of the first double-sided sawtooth; the width of the projection of the third oblique side 141' on the entrance plane gradually increases in the radial direction from the central axis toward the lens edge and the width of the projection of the fourth oblique side 142' on the entrance plane gradually decreases in the radial direction from the central axis toward the lens edge.

No interspace exists between the first/second bump unit and the second/third) bump unit;

The tooth-width of the first orthogonal sawteeth is the same as that of the first double-sided sawteeth;

At the splicing between the first bump unit and the second bump unit, the tooth-depth of the first orthogonal sawtooth closest to the lens edge in the first bump unit is larger than that of the adjacent first double-sided sawtooth which is closest to the central axis in the second bump unit;

In the second bump unit, the tooth-depth of the first double-sided sawteeth gradually increases in radial direction from the central axis toward the lens edge and the tooth-depth of several first double-sided sawteeth is larger than that of the first orthogonal sawtooth closest to the lens edge at the splicing between the first bump unit and second bump unit.

At the splicing between the second bump unit and the third bump unit, the tooth-depth of the first double-sided sawtooth closest to the lens edge in the first bump unit is same as that of the second double-sided sawteeth in the third bump unit;

The tooth-width of the first double-sided sawtooth closest to the lens edge in the second bump unit is larger than that of the second double-sided sawtooth closest to the central axis in the third bump unit;

In the third bump unit, the tooth-width of the second double-sided sawteeth gradually decreases in radial direction from the central axis toward the lens edge.

The structures of the first orthogonal sawteeth and the second double-sided sawteeth are substantially same as those in embodiment 1 and will not be detailed here for simplicity.

The Fresnel lens according to embodiment 2 of the present disclosure is provided with double-sided sawteeth such that each of backlight units corresponding to the three adjacent lens units will contribute to the central lens imaging, which can be used to erase the discontinuous brightness which emerges at the lens peripheral. The principle is described in embodiment 1 and shown in FIG. 3.

The tooth-width of the first orthogonal sawteeth in the first bump unit and the first double-sided sawteeth in the second bump unit of the Fresnel lens according to embodiment 2 of the present disclosure is constant while that in the third bump unit gradually decreases. In other words, the tooth-width according to embodiment 2 of the present disclosure varies gently in a small range, which effectively diminishes brightness defect due to machining deviation and reduces moiré pattern effect and discontinuous brightness.

The tooth-depth of the first orthogonal sawteeth in the first bump unit and the first double-sided sawteeth in the second bump unit of the Fresnel lens according to embodiment 2 of the present disclosure gradually increases as the teeth is further and further from the central axis of the Fresnel lens while that in the third bump unit remains the same. Overall, the tooth-depth varies gently in a small range that is several times smaller than that of the current equal-width unequal-depth Fresnel lens, which will effectively avoid the problems of brightness defect and uneven brightness due to sawteeth fracture. Moreover, moiré pattern effect will be diminished due to the smaller tooth-depth.

Embodiment 3

The differences between the technical solution according to embodiment 3 and embodiment 1 are as follows:

As shown in FIG. 9, the Fresnel lens according to embodiment 3 of the present disclosure comprises an entrance plane and an exit plane with multiple bump units thereon. Each bump unit comprises:

A first Bump Unit comprising multiple First Orthogonal Sawteeth, wherein the first orthogonal sawteeth have the same tooth-width and their tooth-depth gradually increases along the radiation direction from the central axis toward the lens edge.

A second Bump Unit comprising multiple Second Double-sided Sawteeth, wherein the second double-sided sawteeth have the same tooth-depth and their tooth-width gradually decreases along the radiation direction from the central axis toward the lens edge.

The structures of the first orthogonal sawteeth and the second double-sided sawteeth are substantially same as those in embodiment 1 and will not be detailed here for simplicity.

No interspace exists between the first bump unit and the second bump unit; the first orthogonal sawtooth and the second double-sided sawtooth adjacent to the splicing between the first bump unit and the second bump unit have same tooth-depth, while the tooth-width of that first orthogonal sawtooth is larger than or equal to that second double-sided sawtooth.

On one side of the central axis of the lens, the First Bump Unit and the Second Bump Unit are placed successively along the radiation direction from the central axis toward the lens edge; on the other side of the central axis of the lens, the First Bump Unit and the Second Bump Unit are also placed successively along the radiation direction from the central axis toward the lens edge. The Bump Units on both sides of the central axis of the lens are symmetrical.

The Fresnel lens according to embodiment 2 of the present disclosure is provided with double-sided sawteeth such that each of backlight units corresponding to the three adjacent lens units will contribute to the central lens imaging, which can be used to erase the discontinuous brightness which emerges at the lens peripheral. The principle is described in embodiment 1 and shown in FIG. 3.

The tooth-width of the first orthogonal sawteeth in the first bump unit according to embodiment 3 of the present disclosure remains unchanged, while that of the second double-sided sawteeth in the second bump unit gradually decreases. In other words, the tooth-width according to embodiment 3 of the present disclosure varies gently in a small range, which will effectively diminish brightness defect caused by machining deviation and reduce moiré pattern effect and discontinuous brightness.

The tooth-depth variation in the Fresnel lens according to this embodiment by the present disclosure is similar to that in embodiment 1-2, i.e. the tooth-depth gradually increases at the beginning, e.g. to 0.02 mm in FIG. 7, then the tooth-depth remains the unchanged in the second bump unit, that is, the tooth-depth changes in a range several times smaller than that of the current equal-width unequal-depth Fresnel lens. It will effectively avoid the problems of brightness defect and uneven brightness caused by sawteeth fracture. Moreover, moiré pattern effect will be diminished due to the smaller tooth-depth.

Embodiment 4

The differences between the technical solution according to embodiment 4 and embodiment 1 are as follows:

As shown in FIG. 10, the Fresnel lens according to embodiment 4 by the present disclosure comprises an entrance plane and an exit plane with multiple bump units thereon. Each bump unit comprises:

A first Bump Unit comprising multiple First Orthogonal Sawteeth, wherein the first orthogonal sawteeth have the same tooth-width and their tooth-depth gradually increases along the radiation direction from the central axis toward the lens edge;

A second Bump Unit comprising multiple Second Orthogonal Sawteeth, wherein the second orthogonal sawteeth have the same tooth-depth and their tooth-width gradually decreases along the radiation direction from the central axis toward the lens edge;

No interspace exists between the first bump unit and the second bump unit; the first orthogonal sawtooth and the second orthogonal sawtooth adjacent to the splicing between the first bump unit and the second bump unit have same tooth-depth and tooth-width.

On one side of the central axis of the lens, the First Bump Unit and the Second Bump Unit are placed successively along the radiation direction from the central axis toward the lens edge; on the other side of the central axis of the lens, the First Bump Unit and the Second Bump Unit are also placed successively along the radiation direction from the central axis toward the lens edge. The Bump Units on both sides of the central axis of the lens are symmetrical.

The structures of the first orthogonal sawteeth and the second orthogonal sawteeth are substantially same as those in embodiment 1 and will not be detailed here for simplicity Embodiment 5

A display device comprising the Fresnel lens described in embodiment 1, embodiment 2 or embodiment 3 will be detailed hereinafter according to embodiment 5. The display devices provide uniform brightness and good viewing effect, which improves viewing experience in the different viewing ranges.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A Fresnel lens comprising an entrance plane and an exit plane with multiple bump units thereon, wherein
the multiple bump units comprise:
   a first bump unit comprising multiple first orthogonal sawteeth, wherein the multiple first orthogonal sawteeth have the same tooth-width and their tooth-depth gradually increases in a radial direction from a central axis of the Fresnel lens toward an edge of the Fresnel lens;
   a second bump unit comprising multiple second double-sided sawteeth, wherein the multiple second double-sided sawteeth have the same tooth-depth and their tooth-width gradually decreases in the radial direction from the central axis toward the lens edge;
   on one side of the central axis of the lens, the first bump unit and the second bump unit are placed successively in the radial direction from the central axis toward the lens edge; on the other side of the central axis of the lens, the first bump unit and the second bump unit are also placed successively in the radial direction from the central axis toward the lens edge, the bump units on both sides of the lens are symmetrical.

2. A Fresnel lens according to claim 1, wherein
the multiple bump units further comprise a third bump unit arranged between the first bump unit and the second bump unit;
the third bump unit has multiple second orthogonal sawteeth, wherein the multiple second orthogonal sawteeth have the same tooth-depth and their tooth-width gradually decreases in the radial direction from the central axis toward the lens edge.

3. A Fresnel lens according to claim 1, wherein
the multiple bump units further comprise a third bump unit arranged between the first bump unit and the second bump unit;
the third bump unit comprising multiple first double-sided sawteeth, wherein the multiple first double-sided sawteeth have the same tooth-width and their tooth-depth gradually increases in the radial direction from the central axis toward the lens edge.

4. The Fresnel lens according to claim 2, wherein each first orthogonal sawtooth comprises a first right-angle side perpendicular to the entrance plane, a first hypotenuse intersecting with the first right-angle side, and a third included angle formed between the first right-angle side and the first hypotenuse, the third included angle gradually decreases in the radial direction from the central axis toward the lens edge.

5. The Fresnel lens according to claim 3, wherein each first orthogonal sawtooth comprises a first right-angle side perpendicular to the entrance plane, a first hypotenuse intersecting with the first right-angle side, and a third included angle formed between the first right-angle side and the first hypotenuse, the third included angle gradually decreases in the radial direction from the central axis toward the lens edge.

6. The Fresnel lens according to claim 1, wherein each first orthogonal sawtooth comprises a first right-angle side perpendicular to the entrance plane, a first hypotenuse intersecting with the first right-angle side, and a third included angle formed between the first right-angle side and the first hypotenuse, the third included angle gradually decreases in the radial direction from the central axis toward the lens edge.

7. The Fresnel lens according to claim 2, wherein each second orthogonal sawtooth comprises a second right-angle side perpendicular to the entrance plane, a second hypotenuse intersecting the second right-angle side, and a fourth included angle formed between the right-angle side and the second hypotenuse, the forth included angle gradually decreases in the radial direction from the central axis toward the lens edge.

8. The Fresnel lens according to claim 2, wherein each second double-sided sawtooth comprises a first oblique side, a second oblique side intersecting with the first oblique side, both oblique sides intersects with the entrance, and a first included angle formed by the first oblique side and the entrance plane, and a second included angle formed by the second oblique side and the entrance plane.

9. The Fresnel lens according to claim 3, wherein each second double-sided sawtooth comprises a first oblique side, a second oblique side intersecting with the first oblique side, both oblique sides intersect with the entrance, and a first included angle formed by the first oblique side and the entrance plane, and a second included angle formed by the second oblique side and the entrance plane.

10. The Fresnel lens according to claim 1, wherein each second double-sided sawtooth comprises a first oblique side, a second oblique side intersecting with the first oblique side, both oblique sides intersect with the entrance, and a first included angle formed by the first oblique side and the entrance plane, and a second included angle formed by the second oblique side and the entrance plane.

11. The Fresnel lens according to claim 8, wherein the first included angle gradually decreases in the radial direction from the central axis toward the lens edge and the second included angle gradually increases in the radial direction from the central axis toward the lens edge.

12. The Fresnel lens according to claim 9, wherein the first included angle gradually decreases in the radial direction from the central axis toward the lens edge and the second included angle gradually increases in the radial direction from the central axis toward the lens.

13. The Fresnel lens according to claim 10, wherein the first included angle gradually decreases in the radial direction from the central axis toward the lens edge and the second included angle gradually increases in the radial direction from the central axis toward the lens edge.

14. The Fresnel lens according to claim 3, wherein each first double-sided sawtooth comprises a third oblique side close to the central axis of the lens and a fourth oblique side close to the lens edge, the third oblique side and the fourth oblique side intersect at top of the first double-sided sawtooth; the width of the projection of the third oblique side on the entrance plane gradually increases in the radial direction from the central axis toward the lens edge and the width of the projection of the fourth oblique side on the entrance plane gradually decreases in the radial direction from the central axis toward the lens edge.

15. A display device compromising the Fresnel lens according to claim 1.

* * * * *